(12) United States Patent
Tao

(10) Patent No.: US 6,549,239 B1
(45) Date of Patent: Apr. 15, 2003

(54) SMART PROGRESSIVE-SCAN CHARGE-COUPLED DEVICE CAMERA

(75) Inventor: Fan-Ching Tao, Campbell, CA (US)

(73) Assignee: CiMatrix, Canton, MA (US)

( * ) Notice: Subject to any disclaimer, the term of this patent is extended or adjusted under 35 U.S.C. 154(b) by 0 days.

(21) Appl. No.: 09/180,565

(22) PCT Filed: May 6, 1997

(86) PCT No.: PCT/US97/07884
§ 371 (c)(1),
(2), (4) Date: Nov. 6, 1998

(87) PCT Pub. No.: WO97/42756
PCT Pub. Date: Nov. 13, 1997

Related U.S. Application Data

(60) Provisional application No. 60/016,949, filed on May 6, 1996.

(51) Int. Cl.[7] .............................. H04N 5/222; G06K 9/40
(52) U.S. Cl. ....................... 348/371; 348/370; 382/274
(58) Field of Search ................................. 348/370, 371, 348/296, 297, 376; 382/274

(56) References Cited

U.S. PATENT DOCUMENTS

| 5,083,209 | A | | 1/1992 | Inoue et al. ................. 358/228 |
| 5,162,913 | A | | 11/1992 | Chatenever et al. ... 358/213.19 |
| 5,231,501 | A | | 7/1993 | Sakai ......................... 358/209 |
| 5,247,366 | A | | 9/1993 | Ginosar et al. ............. 358/209 |
| 5,325,146 | A | | 6/1994 | Toji ........................... 354/402 |
| 5,420,635 | A | | 5/1995 | Konishi et al. ............. 348/362 |
| 5,477,264 | A | | 12/1995 | Sarbadhikari et al. ...... 348/213 |
| 5,483,280 | A | | 1/1996 | Takahashi et al. .......... 348/296 |
| 5,512,947 | A | | 4/1996 | Sawachi et al. ............ 348/243 |
| 5,521,366 | A | | 5/1996 | Wang et al. ................ 235/454 |
| 5,559,552 | A | | 9/1996 | Inuiya et al. ............... 348/220 |
| 5,640,202 | A | * | 6/1997 | Kondo et al. ............... 348/222 |
| 5,702,059 | A | * | 12/1997 | Chu et al. ................... 235/462 |
| 5,767,904 | A | * | 6/1998 | Miyake ...................... 348/362 |
| 5,909,517 | A | * | 6/1999 | Satou et al. ................ 382/274 |
| 5,969,750 | A | * | 10/1999 | Hsieh et al. .................. 348/15 |
| 5,982,416 | A | * | 11/1999 | Ishii et al. .................... 348/29 |
| 6,094,217 | A | * | 7/2000 | Nishimura ................... 348/96 |
| 6,151,073 | A | * | 11/2000 | Steinberg et al. .......... 348/371 |
| 6,259,478 | B1 | * | 7/2001 | Hori ........................... 348/296 |

* cited by examiner

Primary Examiner—Wendy R. Garber
Assistant Examiner—Lin Ye
(74) Attorney, Agent, or Firm—Orrick, Harrington & Sutcliffe LLP

(57) ABSTRACT

A progressive-scan charge-coupled device (PSCCD) camera (2) may capture an entire frame of an image of an optically readable code. The camera generates a histogram or probability distribution function (PDF) of the images and uses the histogram or PDF to automatically adjust the contrast of the image. The camera also generates a cumulative distribution function (CDF) which is used to automatically adjust the illumination intensity including the brightness of the image and the duration over which the image is obtained. The captured analog video image is converted to a digital video image which may be output over the camera's bidirectional bus interface (14) to a component outside of the camera. Updated programs, parameters and other information may be sent in the opposite direction over the bus interface to the camera. The camera may be mounted at a fixed station or may be incorporated into a portable unit, and may be hand-held and/or battery operated.

2 Claims, 3 Drawing Sheets

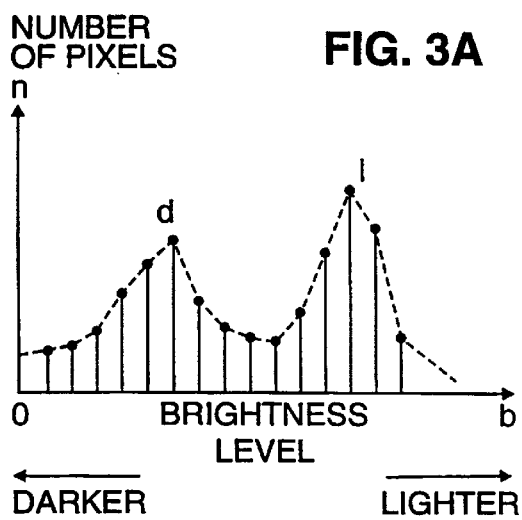
FIG. 3A
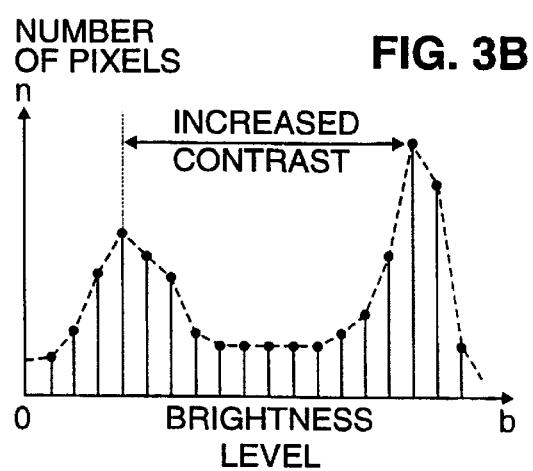
FIG. 3B
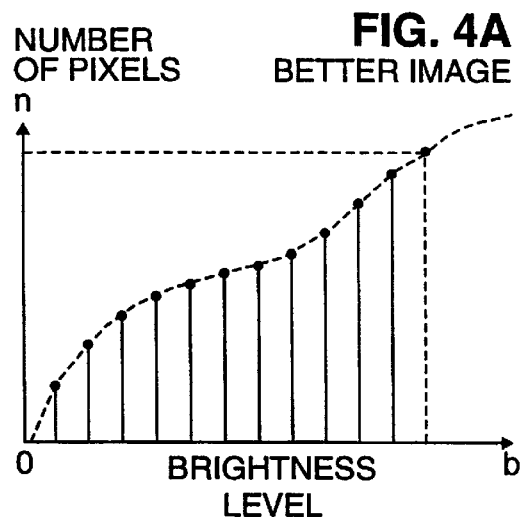
FIG. 4A BETTER IMAGE
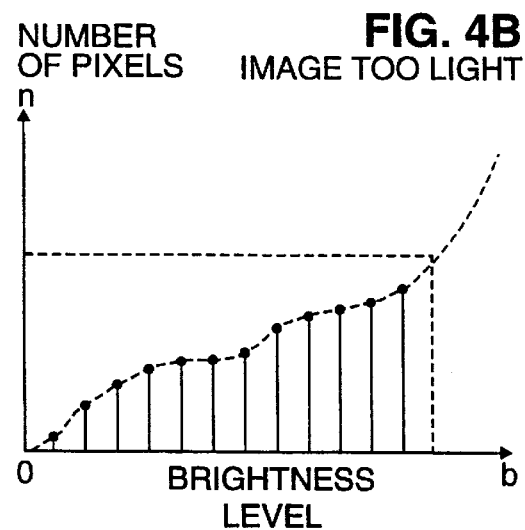
FIG. 4B IMAGE TOO LIGHT
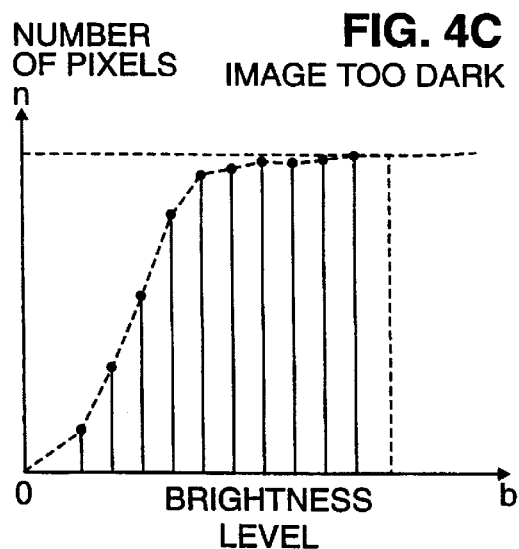
FIG. 4C IMAGE TOO DARK

SMART PROGRESSIVE-SCAN CHARGE-COUPLED DEVICE CAMERA

This application claims the benefit of Provisional Application No. No. 06/016,949, filed May 6, 1996.

FIELD OF THE INVENTION

The present invention relates generally to a system and method for capturing images with an electronic image capturing device, and more particularly to a video imaging system using a progressive-scan charge-coupled device ("PSCCD"), the system automatically adjusting the exposure time and illumination intensity as needed to obtain the correct contrast and brightness for the captured images.

BACKGROUND OF THE INVENTION

Existing imaging systems used in machine vision applications do not automatically adjust to changes in lighting conditions when installed in the field. Therefore, with existing systems, a field application engineer must be sent to a system installation to adjust manually the system to account for changes in lighting conditions which would affect the ability of the imaging system to read an image. There is, therefore, a need for a robust imaging system which can adjust automatically to a varying illumination environment to provide a high quality image capture.

Another major problem encountered in performing machine vision work in general and, in particular, in the decoding of two dimensional matrix codes such as the DATA MATRIX codes of CiMatrix (formerly International Data Matrix), Canton, Mass., is achieving the correct contrast. Contrast is a function of many variables, including geometry and material properties. Primarily, though, it is a function of exposure time (shutter time), illumination intensity, and lens aperture (or f-stop). FIG. 1 illustrates the parameters of the prior art existing systems, which currently have to be manually adjusted. The existing systems effectively (1) set a shutter speed (switch on camera), (2) set the illumination intensity (most of the time by selecting a light type, sometimes by adjusting voltages), then (3) find an f-stop suitable to capture and process the image.

Furthermore, in existing video imaging systems, the image data is interlaced, meaning that the image is split into two alternating fields, each consisting of half of the video lines of information. The first field consists of the odd lines and the next field consists of the even lines. This is done to reduce the bandwidth of the signal for easier transmission and processing. One problem with interlacing is that if there is movement between the two fields, a blurry image results when the image is reassembled from the two fields. This presents a problem with bar code and machine vision applications particularly when the object being scanned is moving. One way to reduce the blur is to throw away one of the fields, but then half the vertical resolution is lost.

Another problem with interlacing is presented where an image is fast moving such that one would desire to capture the image rapidly. If using a strobe light to illuminate the image for rapid capture, the image is illuminated with a bright light for only a brief period of time such as, for example, 1 ms. With such a brief amount of illumination time, only one field of the interlaced image, which is obtained over a 30 ms period, will be illuminated.

Progressive scanning is superior to interlacing since a progressive-scan image consists of full frames of information; that is, all the lines are imaged and transmitted together. With progressive scan, all the data and resolution of an image is preserved.

SUMMARY OF INVENTION

It is therefore an object of this invention to provide a video imaging system wherein the contrast and brightness can be adjusted automatically.

It is a further object of this invention to provide a video imaging system which captures a full frame of information in a non-interlaced format with, for example, a progressive-scan charge-coupled device or a CMOS sensor.

It is a further object of this invention to provide a video imaging system outputting a digital video signal which can interface bidirectionally with external digital devices, such as an external display controller for displaying the digital signal or other external circuitry for updating programs and parameters.

It is a further object of this invention to provide a video imaging system which is asynchronous, allowing an image to be captured by the imaging system at any time, as soon as a command is received from an external application or device, without waiting for the imaging system to be synchronized with an external clock.

In accordance with one aspect of the present invention, a system for video imaging of an object is provided. In one preferred embodiment the system comprises an illumination source with an adjustable intensity a two-dimensional progressive scan CCD (PSCCD) sensor, having an optical input, a lens assembly positioned relative to the PSCCD sensor to image an object on the optical input, an A/D converter for converting an analog electrical signal from the CCD sensor into a digital data set corresponding to a video image of the object, a timing circuit having a time control signal coupled to the PSCCD sensor to control an exposure time during which the PSCCD sensor senses the optical input, and processing means operatively connected to the illumination source and the timing circuit for automatically adjusting the intensity of the illumination source and for controlling the timing circuit to adjust the effective shutter speed of the CCD in response to changing lighting conditions. In a preferred embodiment, the system is a camera.

In another embodiment of the invention, the A/D converter comprises a high and low reference input which are adjustable to adjust the contrast. In this embodiment, the system further comprises at least two D/A converters, including a first D/A converter connected from the processing means to the high reference input of the A/D converter to adjust the high reference level and a second DIA converter connected from the processing means to the low reference input of the A/D converter to adjust the low reference.

The system further comprises a digital interface over which the digital data set may be output to an external component. Another aspect of the invention concerns a method of capturing the video image of an object. One such method comprises illuminating the object with an illumination source, obtaining an optical image of the illuminated object, providing a sensor having an exposure time to sense an image and an analog output, controlling the exposure time during which the sensor senses the optical image, thereby producing an effective shutter speed, converting the optical image using the sensor into an analog electrical signal, converting the analog electrical signal into a digital video data set corresponding to a video image of the object, determining a histogram and a cumulative distribution function of brightness levels of the digital video image signal, determining a change in lighting conditions in response to the digital video image signal and automatically adjusting the intensity of the illumination source and the effective shutter speed, in response to a determined changed lighting conditions as a function of the histogram and cumulative distribution function.

Where the object read comprises an optically readable code, two brightness levels, corresponding to a light level and a dark level, are predominant. In this situation, the step of automatically adjusting the effective shutter speed preferrably also comprises determining the two predominant brightness levels from the histogram to determine the actual contrast of the optical image, determining a desired contrast of the optical image, determining whether an adjustment to the contrast is required based on the histogram for each of the two brightness levels, and, if necessary, adjusting the contrast by changing the effective shutter speed.

In a preferred embodiment the automatic adjustment of the intensity of the illumination source comprises determining an optimal value of the cumulative distribution function, comparing the optimal value of the cumulative distribution function to an actual value of the cumulative distribution function and adjusting the intensity of the illumination source until the actual value of the cumulative distribution function is the same as the optimal value of the cumulative distribution function.

BRIEF DESCRIPTION OF THE DRAWINGS

FIGS. 3A and 3B illustrate the histograms of the brightness levels of is two illustrative images.

FIGS. 4A–4C illustrate the Cumulative Distribution Function for various illustrative images.

DETAILED DESCRIPTION OF THE PREFERRED EMBODIMENT

Figure 2:
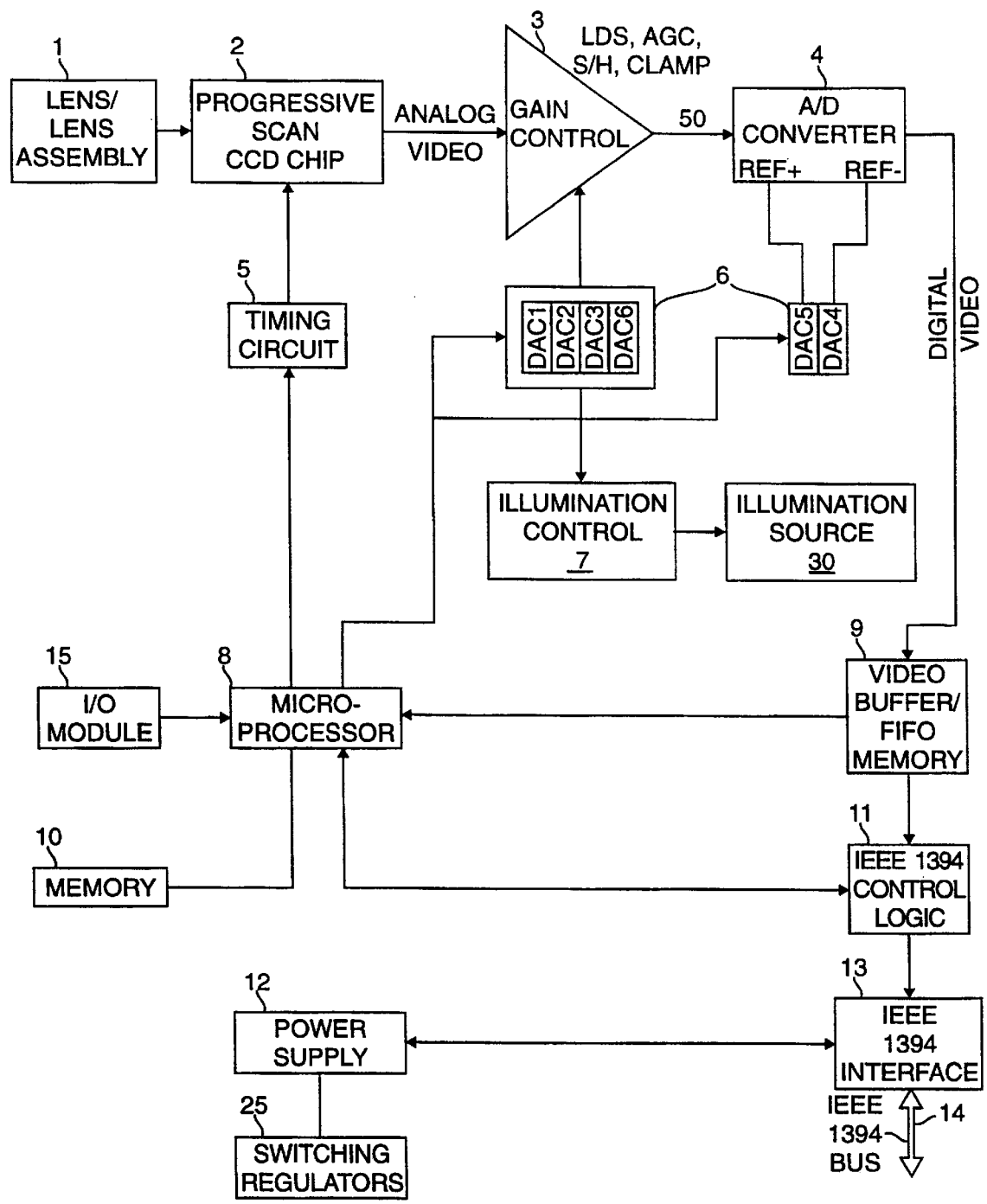
FIG. 2 illustrates the functional block diagram of a preferred embodiment of the present invention.

FIG. 2 illustrates a block diagram of a preferred embodiment of the PSCCD camera according to the present invention which comprises the following functional blocks: lens/lens assembly 1, PSCCD chip 2, timing circuit 5, gain control 3, analog to digital ("A/D") converter 4, a number of digital to analog ("D/A") converters 6, illuminator control 7, microprocessor 8, video buffer/FIFO Memory 9, memory 10, power supply 12, interface bus 14, input and output ("I/O") module 15. The functional blocks and their interrelationship will now be described.

Lens/lens assembly 1 (generically "lens") brings an image into focus on the PSCCD sensor 2. The lens 1 may have manual adjustments, for focus, focal length, and aperture. Alternatively, the focus, focal length and aperture may be electrically controlled by the PSCCD camera by setting the voltage levels used to control these parameters with the microprocessor 8 in accordance with a suitable software program and, if necessary, D/A converters 6. Where an autofocus lens is used, parameter settings can be monitored by the microprocessor 8 via a potentiometer readout on the lens assembly and additional analog to digital (A/D) converters (not shown).

In the preferred embodiment, lens 1 is an off the shelf item with an industry standard lens mount, such as a "C mount" system. Lens 1 is mechanically screwed or otherwise attached to the camera and, in an embodiment where an electrically controlled lens assembly is used, is also connected to the camera's circuitry via electrical contacts and/or a cable for sending and receiving signals to automatically control the focus, focal length, and aperture of the lens 1.

The PSCCD chip 2 contains a PSCCD sensor comprising a two dimensional array of electronic elements that converts an optical image into an analog electrical signal. It is progressively scanned so that an entire image is read out together rather than in two separate fields. This eliminates the blurring of the images when there is motion between the capture of the two fields.

As is well known to one of ordinary skill in the art, in a camera employing a CCD sensor, the effective shutter speed of the camera may be implemented electronically within the CCD sensor and is adjusted by a timing circuit 5 which controls the amount of time the CCD sensor senses an image. The slower the shutter speed, the longer the charge builds on the CCD sensor 2. In the preferred embodiment, the timing circuit 5 is under the control of the microprocessor 8 which calculates and adjusts the effective shutter speed as described below. Preferably, the shutter speed is no more than 4 ms to avoid motion blur problems. The function and the implementation of the timing circuit is conventional.

In the preferred embodiment, the PSCCD chip 2 is a ⅓ inch black and white sensor with 692 by 504 pixels (e.g. manufactured by SONY, model# ICX084AL). The Sony chip is preferred because it provides the 640 by 480 resolution commonly used in VGA monitors in the personal computer industry and is of low cost (although sensors with other resolutions may alternatively be used). The Sony chip is also preferred because it is one of a set of Sony chips which can be easily implemented in constructing the necessary circuitry for this embodiment. The chip set includes a low-level timing generator (Model CXD2434TQ) which forms part of timing circuit 5, gain control 3 (Model CXA1690Q), A/D converter 4 (Model CXD2311AR), a clock driving chip (not shown) and other control circuitry.

In addition to the low-level timing generator, timing circuit 5 includes a second chip comprising a field programmable gate array (FPGA) which provides high-level timing control. An FPGA is also needed to perform the integration required for calculating the histogram, the probability distribution function and the cumulative distribution function discussed below and for the FIFO buffer 9. Thus, a second FPGA may be included as part of FIFO buffer 9 and a third FPGA may be electrically connected between A/D converter 4 and FIFO buffer 9 for performing integration. Alternatively, the various functions performed by these three FPGA's may be combined on one or two FPGA's.

The low level analog signal from the PSCCD 2 is amplified with a variable gain circuit at automatic gain control (AGC) stage 3, to allow adjustment for varying image levels. The AGC stage 3 also sets the basic black level of the video signal and further provides sample and hold, correlated double sampling (CDS), and clamping capabilities.

In the preferred embodiment, microprocessor 8 sets the gain level by controlling the voltage level from three D/A converters 6 DAC1–DAC3. One of these D/A converters 6 controls the AGC contrast, a second controls the AGC maximum setting, and a third sets the DC offset.

The A/D converter 4 converts the analog video signal transmitted from the gain control stage 3 into digital information. The lower and upper A/D references Ref– and Ref+ are set through two D/A converters, DAC4 and DAC5, so that the black level and gain adjustments may be made directly through the microprocessor 8 algorithmically or indirectly through the microprocessor 8 via interface bus 14.

By altering the upper and lower A/D references, the adjustments in black level and gain also operate to adjust the contrast.

In the preferred embodiment, the A/D converter 4 generates a 10 bit digital pixel. If only eight bit digital data are required, only the upper eight bits may be used. Using a 10 bit A/D converter allows better resolution, particularly where a fast A/D conversion reduces the effective number of bits. Also, the lower eight bits are used to determine any black level offset which can be fed back to the lower reference Ref– of the A/D converter 4 to perform automatically a fine adjustment of the black level.

The illumination source 30 supplies lighting to the image. It may be an ambient light source or it may be a light source attached to and controlled by the PSCCD camera such as an incandescent or fluorescent lamp, light emitting diodes (LEDs), a strobe lamp or any other illumination technology suitable for lighting in the visible, infrared or ultraviolet spectra. The duration and intensity level of the illuminator may be controlled by the microprocessor 8 via illumination control 7 in any conventional, well-known way.

In the preferred embodiment, the illumination source 30 is an array of LEDs arranged to give an even field of light at the subject distance. The LEDs are pulsed to give a strobe-like effect. One preferred embodiment of the LED array comprises 8 LEDs, emitting at 640 nm wavelength, arranged in a ring or other formation as suitable for the application. If the illumination provided by the LEDs is inadequate for a specific application, or if the images must be read at very high speeds, a strobe lamp may be used. However, generally, the LEDs are preferred because they are less expensive than strobes.

Illumination control 7 is a current-controlled switch consisting of an op-amp and field-effect transistor. The intensity level of the LEDs is controlled by a current source which is set by the microprocessor 8 and one of D/A converters 6 DAC6. The duration of the illumination is controlled by switching the LEDs on and off. Additionally, the illumination can be synchronized to the PSCCD shutter with timing signals from timing circuit, 5.

D/A converters DAC1, DAC2, DAC3 and DAC6 may be low speed converters as the parameters they affect are typically left unchanged for relatively extended lengths of time. A/D converters DAC4 and DAC5 for controlling the high and low reference levels of A/D converter 4, however, must provide fast access, as those values can be changed as fast as every scan line.

Memory module 10 is provided to store configuration information and system parameters, and may also store programs and data. Memory 10 may comprise multiple forms of memory. While nonvolatile memory is required for configuration and parameter information, volatile memory may be used for program and data storage. Suitable forms of nonvolatile memory include Electrically Erasable Programmable Read-Only memory (EEPROM) and Flash Memory. Of course, the memory 10 can also integrate the function of FIFO memory 9.

The video buffer/FIFO memory 9 receives digital video data from the A/D converter 4 and stores them before sending them to the interface bus 14. Since the PSCCD 2 may be continuously sending data, this memory buffers the data so that the data are not lost before they are acquired by the interface bus 14.

The interface bus 14 connects the PSCCD camera to one or more external devices, such as controllers, decoders and other cameras. The bus is bidirectional, receiving control information and software and parameter updates for the camera as well as sending images or other information.

In the preferred embodiment, the interface bus 14 implements the IEEE standard 1394 "Standard for a High Performance Serial Bus", as published by the Institute of Electrical and Electronic Engineers, Inc., herein referred to as the IEEE 1394 bus. The IEEE 1394 bus is a serial bidirectional bus capable of 100, 200, and 400 Megabits/sec data transfer rates. It is physically implemented with simple, six-wire, shielded cable. It is a low cost bus adopted by the personal computer and video industry for the transportation of video and other high speed digital information. Several devices may be interconnected in various configurations to interface to bus 14. Devices also may be "live" plugged in interface bus 14 as well.

The IEEE 1394 control logic and physical interface 11 are implemented in the preferred embodiment with a commercially available chip set and/or a programmable logic device. One example of the commercial chip set available is Texas Instrument part numbers TSB 12LV31 and TSB 11LV01. integrated circuits which implement the Link Layer Control and Cable Transceiver functions respectively.

The PSCCD camera also incorporates an input/output (I/O) module 15 designed to communicate with additional sensors and instrumentation on a production line. For example, a sensor on the line may use I/O 15 as a trigger input to tell the CCD sensor when to capture an image.

The implementation of the I/O module 15 is conventional. In the preferred embodiment, the input/outputs of the I/O module 15 are optically isolated from external electrical circuits. The internal microprocessor 8 is connected to the I/O module 15 so that the microprocessor 8 can read and set the level on each input/output to control a machine, for example.

The power supply 12 converts external power to the various voltages required by the internal circuits.

In the preferred embodiment, external power is supplied by the interface bus 14. This consists of an 8 to 40 Volt DC source. To convert this large voltage range to the voltages, required internally, switching regulators 25 are provided and are attached to power supply 12. Switching regulators 25 are efficient and generally do not require heat sinking, although heat sinking may be provided.

Switching regulators 25, however, disadvantageously create noise, to which the CCD is very sensitive. To reduce the effect of this noise, the pixel clock and switching regulator 25 are preferrably synchronized so that the noise created by switching regulator 25 is periodic, which allows the noise to be compensated for.

There is conventional circuitry (not shown) in the power supply 12 to suppress voltage spikes such as from Electrostatic Discharge (ESD), to control turn on surges, and to protect the equipment in case of an abnormal current fault. There are also filters in the power supply to reduce electromagnetic interference (EMI), both to protect sensitive internal circuits and to help the equipment meet worldwide standards for EMI.

In another embodiment, if the IEEE 1394 bus is not powered by an external device or application, then a power supply may be separately and externally supplied through a conventional power jack (not shown), which would generate all the power requirements for the camera.

An internal microprocessor 8 controls the function of the PSCCD camera and communicates with the interface bus 14. The microprocessor 8 can be of various sizes and performance levels depending upon the functionality desired. In one embodiment the microprocessor 8 is a high performance RISC (Reduced Instruction Set Computer) design capable of decoding bar codes, matrix codes and performing other image processing functions.

In the preferred embodiment, microprocessor 8 is a conventional low cost 8 bit microcontroller with internal non-volatile program memory, data Random Access Memory (RAM), inputs and outputs (I/O), timers, and other features. The microprocessor 8 is capable of controlling camera functions such an effective shutter speed, gain, and illumination. More powerful microcontrollers may be used if faster speeds are required or additional features are added.

In operation, the aperture size (f-stop) is set first. Thereafter, as described below, for a selected aperture (f-stop) the PSCCD camera automatically adjusts the contrast by controlling the exposure time of the CCD sensor and automatically adjusts the brightness levels for capturing an image by controlling the illumination intensity of the light source.

In a preferred method of automatic exposure control, an image is digitized to n total pixel elements, each of which has b possible brightness levels. As shown in FIG. 4A, the microprocessor 8, using this information, creates a histogram of brightness levels in the image, which indicates the number of pixels of each brightness level. Where the image is a one or two dimensional bar code, matrix code, or other optically readable code, two brightness levels, a light and a dark, will usually predominate. These are shown in FIG. 3A as peaks l and d, respectively. The contrast of the image can be determined by the distance between these two peaks.

The contrast can be adjusted in several ways. First, the exposure level can be changed by changing the effective shutter speed. This alters the amount of time the CCD sensor integrates the image. This shifts the peaks up (slower shutter speed) or down (faster shutter speed) so that if one is at a limit, more distance or contrast results. Second, the low and high references Ref− and Ref+ of the A/D converter 4, which determine the minimum and maximum levels, also can be changed. For example, if the two peaks are spaced close together in the histogram as shown in FIG. 3A, the references can be moved closer together (one or both) so that in the new image, the peaks are further apart, resulting in increased contrast as shown in FIG. 3B. In the preferred embodiment, the adjustment of the references for the A/D converter 4 is done by the microprocessor 8 through the D/A converters 6. These two techniques can be used independently or cooperatively to, for example, maximize the contrast. This can easily be implemented by microprocessor 8 by identifying the peaks d and l, determining the distance (i.e., the number of brightness levels) therebetween, and shifting one or both of the reference levels and shutter speed until the distance is maximized within the ranges that the two parameters can be adjusted.

As an alternative to the histogram, the probability distribution function (PDF) of the image, which is the histogram function divided by the total area or number of pixels, may be calculated to determine the contrast. The PDF contains the probability that a pixel in the image has a certain brightness level. Although either the histogram or PDF may be used, usually the histogram is easier and faster to calculate because no division is required.

The automatic adjustment of the brightness level is performed by first calculating the Cumulative Distribution Function (CDF) of the image. The CDF of an image at a certain pixel brightness level is calculated by summing all of the values of the PDF up to that level. In effect, it is an integration of the brightness levels in an image, resulting in an overall brightness level. For a certain exposure or overall brightness level, the CDF should reach a certain value at a selected brightness level. A CDF which achieves this specified value is shown in FIG. 4A. Optimum levels can be determined empirically from sample images. If the calculated level is above or below the optimum level, FIGS. 4B and 4C, respectively, the exposure can be increased or decreased by changing the shutter speed, illumination, aperture, or gain.

As with the histogram, the total area or number of pixels does not need to be included in the calculation of the CDF for the present preferred embodiment. Only the histogram levels need to be added, eliminating a division step. The resulting function starts at 0 and increases towards the total number of pixels (instead of 1).

Ideally the histogram and CDF are calculated from the entire image. To speed the computation and to reduce the storage requirements, a sample of the original image containing the code can be used instead. It has been determined empirically that a pseudorandom sampling of approximately 200 to 500 pixels in the center area of an image 640 by 480 pixels in size is sufficient to calculate a good exposure on most images. Of course, a larger or smaller sample may be used, depending on the nature of the code to be scanned.

Figure 1:
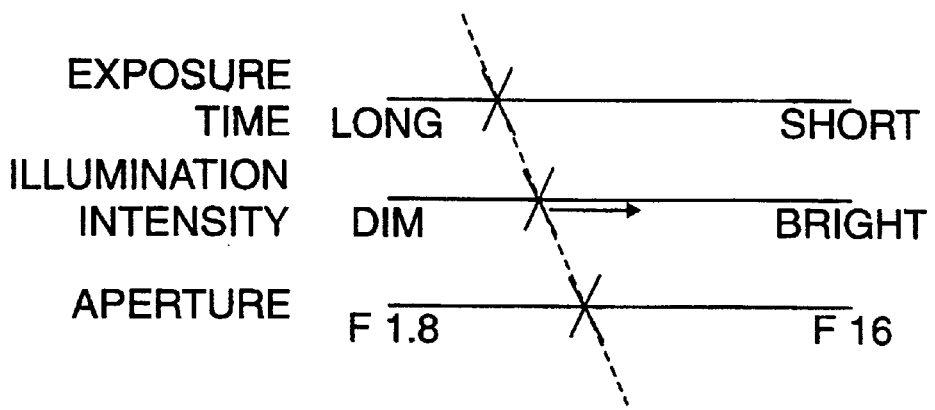
FIG. 1 illustrates the parameters of an existing system which have to be manually adjusted.
Figure 5:
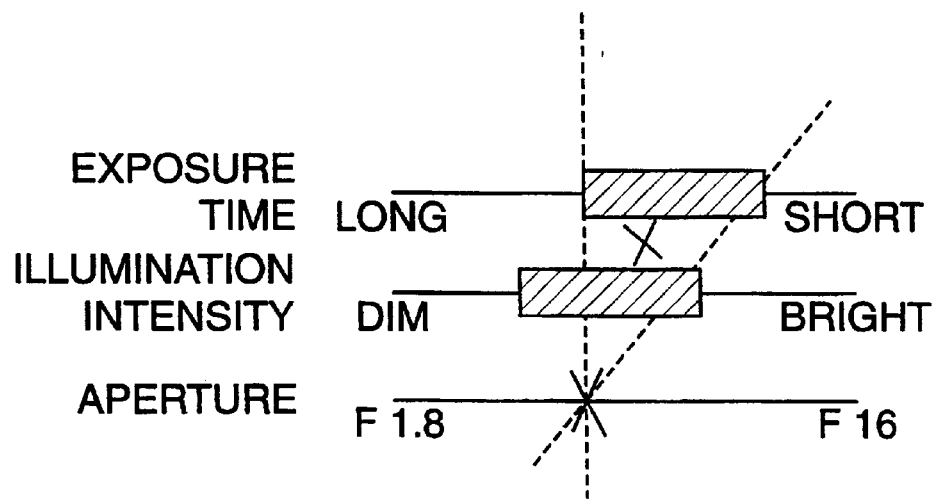
FIG. 5 illustrates the parameters of the present invention, including the exposure time and illumination intensity which may be adjusted automatically.

As seen in FIG. 5, where the aperture size is set and the image has a good contrast, the solution space X for determining an appropriate contrast and illumination intensity is cone-shaped. However, if there is a bad contrast, minimal adjustments can be made to improve the reading of the image.

No specific algorithm for selecting an appropriate aperture size, contrast or illumination intensity is provided herein as a number of appropriate algorithms will be evident to one of ordinary skill in the art and any algorithm provided would be environment-dependent. For example, where an image is being read in a specular environment, the algorithm would minimize the increase in illumination intensity to avoid too large an increase in light which would interfere with the reading of the image. As another example, if one is reading images outdoors, or indoors near a window exposed to bright light, the algorithm would probably modify the shutter speed before rmiaking any other adjustments.

Based on the above description, it should be understood that the camera of the present invention may be mounted at a fixed station, or may be a portable unit and may be hand-held and/or battery operated.

It should be further understood thatthe embodiments and variations shown and described herein are illustrations only and that various modifications may be implemented by those skilled in the art without departing from the scope and spirit of the invention. For example, although the above description refers to capturing an image with a PSCCD sensor, image may be captured sensor which captures a full frame of information in a non-interlaced format, such as a CMOS sensor.

I claim:

1. A system for video imaging of an object having an illumination source with an adjustable intensity, comprising:
    a progressive-scan charge-coupled device (PSCCD) sensor having an exposure time, an exposure time signal input, an optical input and an analog electrical signal output corresponding to an optical image at said optical input;
    a lens assembly positioned relative to said PSCCD sensor to image said object on said optical input; an A/D converter for converting the analog electrical signal into a digital data set corresponding to a video image of the object, said A/D converter comprising a high reference input and a low reference input which are adjustable to adjust the contrast, and further comprising a first D/A converter connected from said processing means to said high reference input of said A/D converter to adjust the high reference level and a second D/A converter connected from said processing means to said low reference input of said A/D converter to adjust the low reference level;

a timing circuit having a time control signal output coupled to the PSCCD sensor exposure time input to control an exposure time during which the PSCCD sensor senses said optical input, said exposure time signal corresponding to an effective shutter speed for the video system; and a processing means operatively connected to said illumination source, having an adjustable brightness and duration, and said timing circuit for automatically adjusting the intensity of the illumination source, including the brightness and duration thereof, and for controlling the timing circuit to adjust the effective shutter speed in response to changing lighting conditions, including processing means for selecting a digital video data set, processing means for determining a histogram and a cumulative distribution function of brightness levels of a selected digital video data set, and means for determining a change in lighting conditions.

2. A method of capturing a video image, of an object having an optically readable code having two predominant brightness levels, a light level and a dark level, comprising the steps of:

illuminating the object with an illumination source which is adjustable in intensity brightness, including brightness or duration;

obtaining an optical image of the illuminated object;

providing a sensor having an exposure time to sense an image and an analog output;

controlling the exposure time during which the sensor senses the optical image, thereby. producing an effective shutterspeed;

converting the optical image using said sensor into an analog electrical signal providing an A/D converter having a high reference and a low reference for converting the analog electrical signal into the digital video data set corresponding to a video image of the object;

determining a histogram and a cumulative distribution function of brightness levels of the digital video image signal; and automatically adjusting the contrast of the image, in response to a determined changed lighting condition, by identifying a first peak for said light level and a second peak for said dark level from said histogram;

determining a desired contrast;

determining the distance between the first and second peaks on the histogram to determine an actual contrast and determining whether an adjustment to the actual contrast is required to achieve the desired contrast; and, if necessary, adjusting the contrast by changing at least one of the high and low references of the A/D converter to achieve the desired contrast.

* * * * *